United States Patent [19]
Shih

[11] Patent Number: 5,471,853
[45] Date of Patent: Dec. 5, 1995

[54] DEVICE FOR MASS PRODUCTION OF ICE CARVINGS

[76] Inventor: Wen-Fang Shih, No. 37, Lane 81, Li Jen Rd., Ta Li, Taichung Hsien, Taiwan

[21] Appl. No.: 285,160

[22] Filed: Aug. 3, 1994

[51] Int. Cl.⁶ .................................................. F25C 1/00
[52] U.S. Cl. ........................... 62/345; 62/356; 425/134; 425/216; 425/451
[58] Field of Search .................. 62/345, 356; 425/134, 425/216, 451

[56] References Cited

U.S. PATENT DOCUMENTS

| | | | |
|---|---|---|---|
| 3,295,159 | 1/1967 | Fischer | 425/216 |
| 3,910,741 | 10/1975 | Mehnert | 425/216 X |
| 4,546,615 | 10/1985 | Gram | 62/345 X |
| 4,593,537 | 6/1986 | Visser | 62/345 |

*Primary Examiner*—William E. Tapolcai
*Attorney, Agent, or Firm*—Bacon & Thomas

[57] ABSTRACT

The present invention relates to a mass production device for ice carvings mainly for the automatic production of ice carvings. The invention has a conveyor belt, molding dies, a cooling water tank, a freezing mixture tank, a boring device, an injection device, a temperature rising device and a stripping device. Filtered and cool water is poured into the dies, and the dies delivered into a freezing mixture tank through the conveyor belt for freezing the surface of water in the dies first. A boring hole is used for injection of coloring liquid and decorative objects to be embedded in the frozen carvings. When the dies exit from the freezing mixture tank, they enter a temperature rising device to slightly raise their temperature to facilitate removal of the dies by means of hydraulic cylinder of the stripping device. Ice carvings are thus accomplished through automatic production.

1 Claim, 6 Drawing Sheets

DEVICE FOR MASS PRODUCTION OF ICE CARVINGS

BACKGROUND OF THE INVENTION

The present invention relates to a device for mass production of ice carvings, comprising a conveyor belt, dies, a cooling water tank, a freezing mixture tank, a boring device, an injection device, a temperature rising device and a stripping device. The aforesaid devices enable fast mass production of ice carvings without the need of slow carving by hand labor.

At a party or other social activity, ice carvings are often provided as a catalyst for creating an amusing atmosphere, an arrangement of ice carvings may provide a vivid atmosphere, as well as demonstrate wonderful layout by the host to enable guests to feel welcome.

Conventional ice carvings are made through carving by hand labor with a carving knife and therefore involve the following defects:

a. carving by hand labor is slow in production and because of high cost cannot become popular. Further, such ice carvings seem to be some kind of waste for they tend to melt soon;

b. ice is a fragile object and no mistake is permitted during the process of carving for it would be a total failure in the event of an error, so that there is great risk during production;

c. though conventional ice carving is beautiful, ice carving is colorless and without any decoration to give any change in result.

To provide consumers with cheap, delicate and beautiful ice carvings, the inventor therefore has successfully developed a mass production device for ice carvings to enable full automation of ice carvings and to reduce production cost.

DETAILED DESCRIPTION OF THE PREFERRED EMBODIMENT

Figure 1:
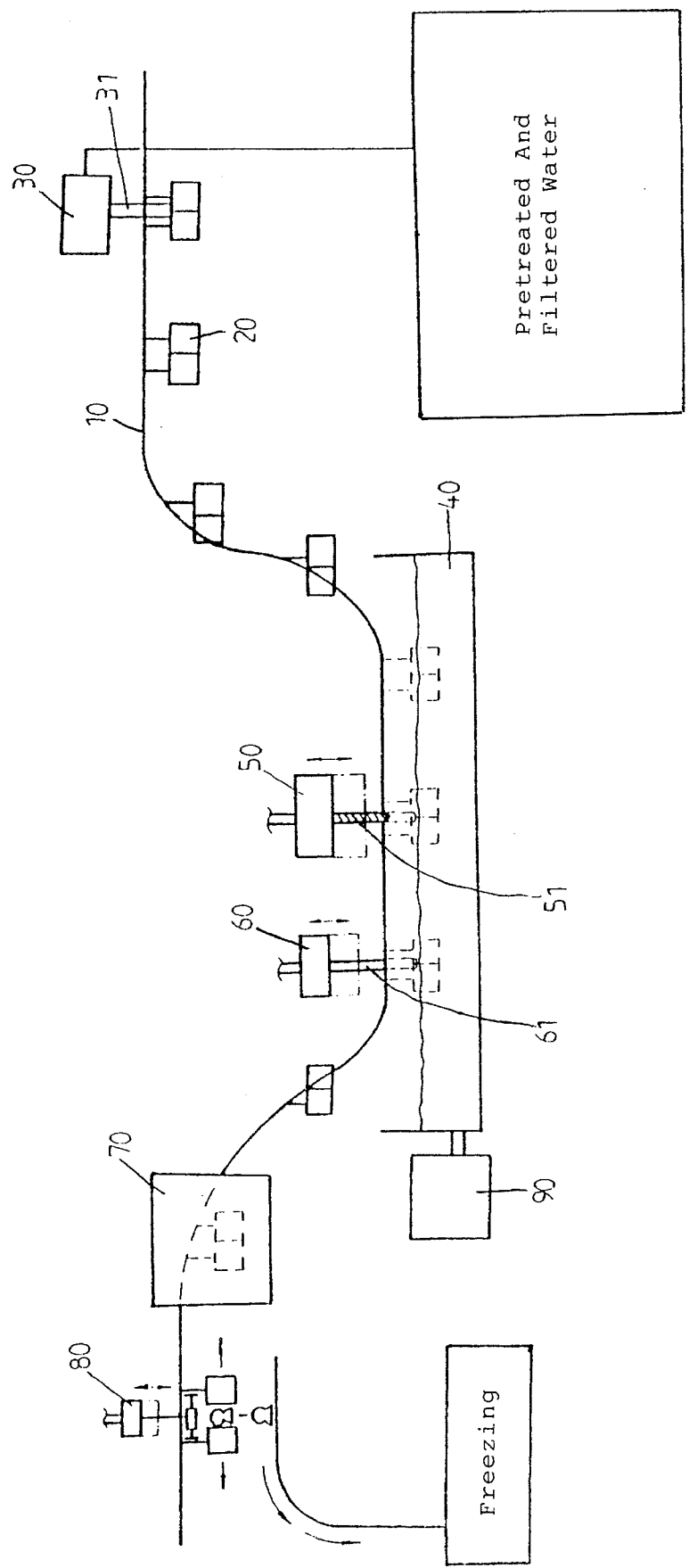
FIG. 1 is a schematic structural and manufacturing process diagram of the present invention.
Figure 2A:
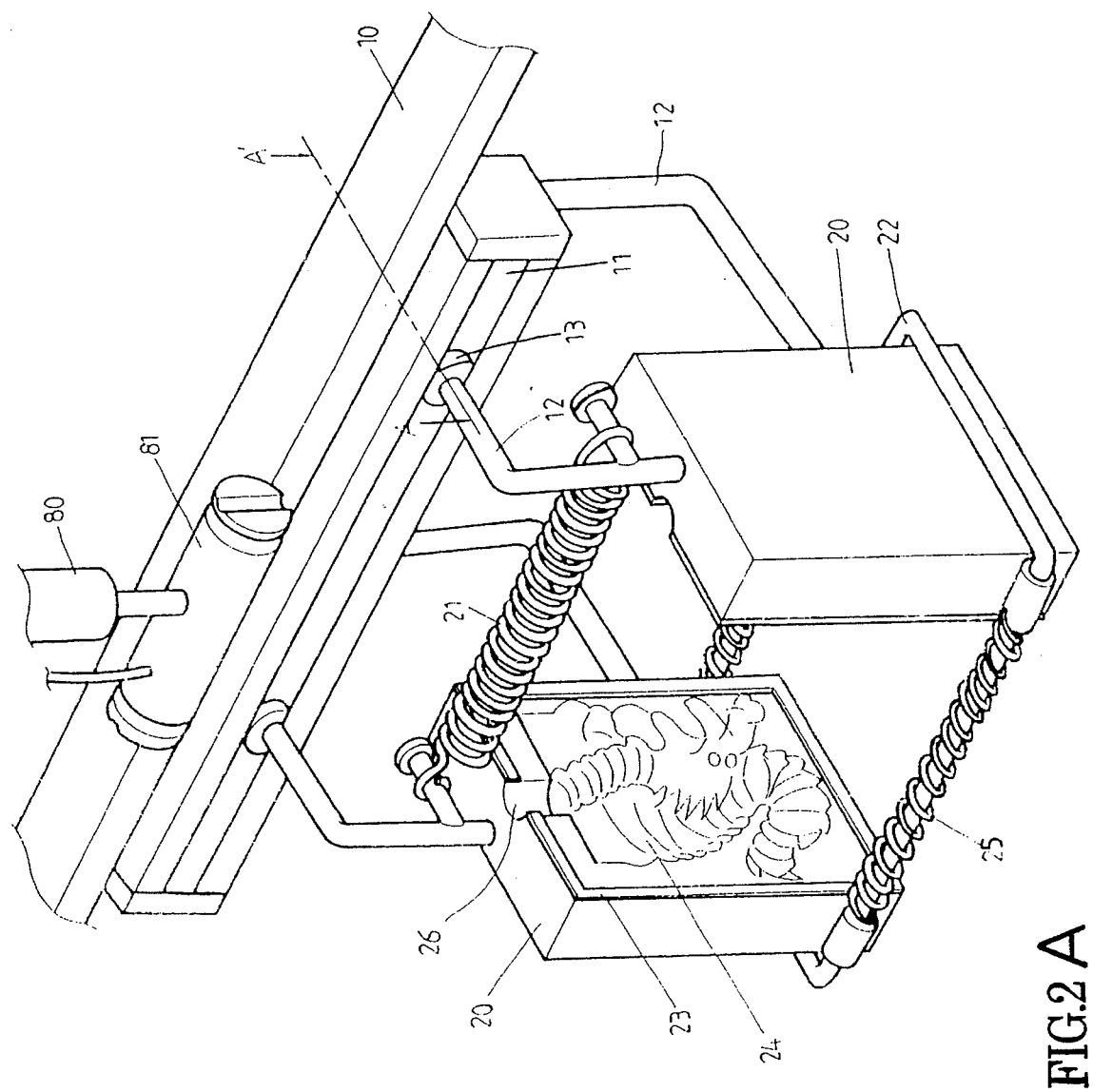
FIG. 2A is a perspective view of the structure of the present invention.
Figure 2B:
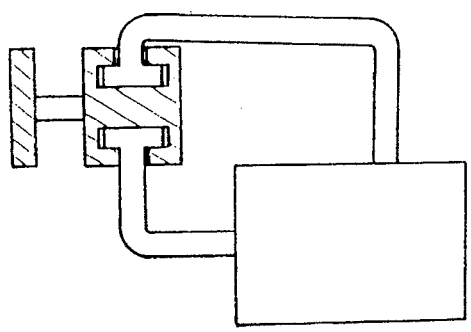
FIG. 2B is a cross-sectional view taken along line A—A in FIG. 2A.

Referring to FIGS. 1 and 2, the present invention comprises conveyor belt 10, die 20, cool water tank 30, freezing mixture tank 40, boring device 50, injection device 60, temperature rising device 70 and stripping device 80 wherein said conveyor belt 10 connects with a slide rail 11 thereunder. Said die 20 includes die cavity 24 having leak-proof washer 23 on a perimeter and on top having boring hole 26. It also includes a sidewise extending bracket 12 having pulley 13, a spring 21 located between two brackets 12, and on a perimeter of said die 20, a running rail 22. In the middle portion of running rail 22 a spring 25 is located for connection of two dies.

Said cool water tank 30 is functional to maintain water flow at a low temperature, and has water guide tube 31. Said freezing mixture tank 40 is filled with a freezing chemical in connection with a freezer 90. Said boring device 50 is mounted on top of the unit with a hydraulic lifter whereby the bottom with boring head 51 is extensible to contact with die 20. Said injection device 60 is mounted on top of the unit with a hydraulic lifter, to make the bottom with an injection tube 61 extensible to contact with die 20. Said temperature rising device 70 may cause a slight rise of temperature within die 20. Said stripping device 80 is mounted on top of the unit with a hydraulic lifter, each side with extensible hydraulic cylinder 81.

The aforesaid members are assembled together as such: referring to FIG. 2A, brackets 12 extending from said die 20 are inserted in the slide rail 11 under conveyor belt 10 by means of pulley 13, and two dies 20 can be opened or closed by means of pulley 13 running in the slide rail 11.

The production of ice carvings according to the present invention is detailed below:

1. Referring to FIG. 1, water for the production of ice carvings is filtered first and then mixed with a chemical mixture to make the ice carvings more transparent, crystal and harder to melt. Meanwhile, water temperature is reduced near 0° C. to prevent the die from cracking due to shrinking as a result of rapid lowering of the water temperature when water becomes frozen and to prevent ice from blistering due to the rapid change in temperature.

2. Pre-treated and filtered water is used to cool water tank 30 and to maintain water temperature near 0° C. A partial amount of water is poured into die 20 through boring hole 26 from water guide tube 31, referring to FIG. 2, after two dies 20 are tightly pulled together by springs 21, 25 to match leak-proof washer 23 for prevention of water from leaking out of dies 20.

Figure 3:
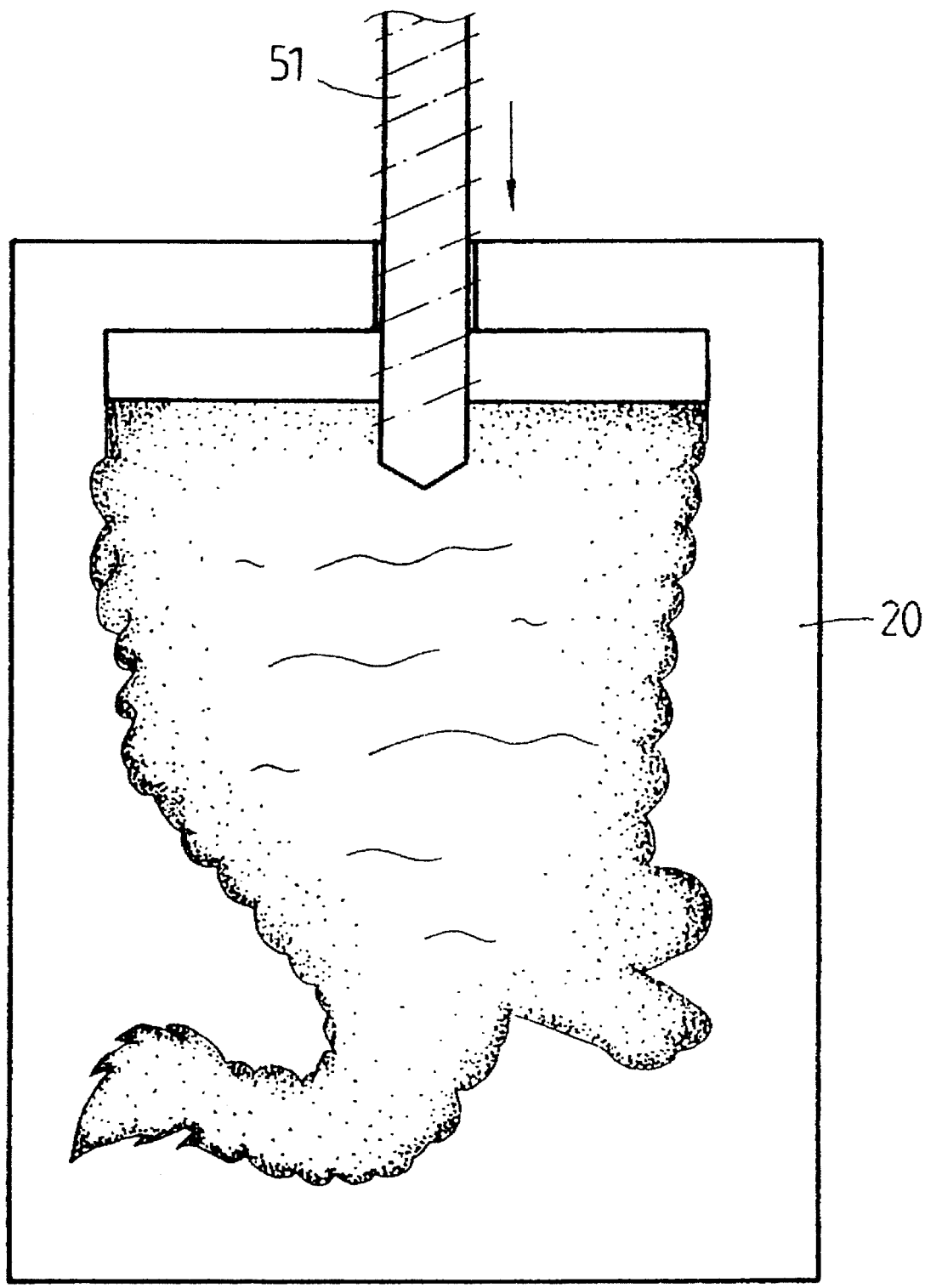
FIG. 3 illustrates an embodiment of the boring device of the present invention.
Figure 4:
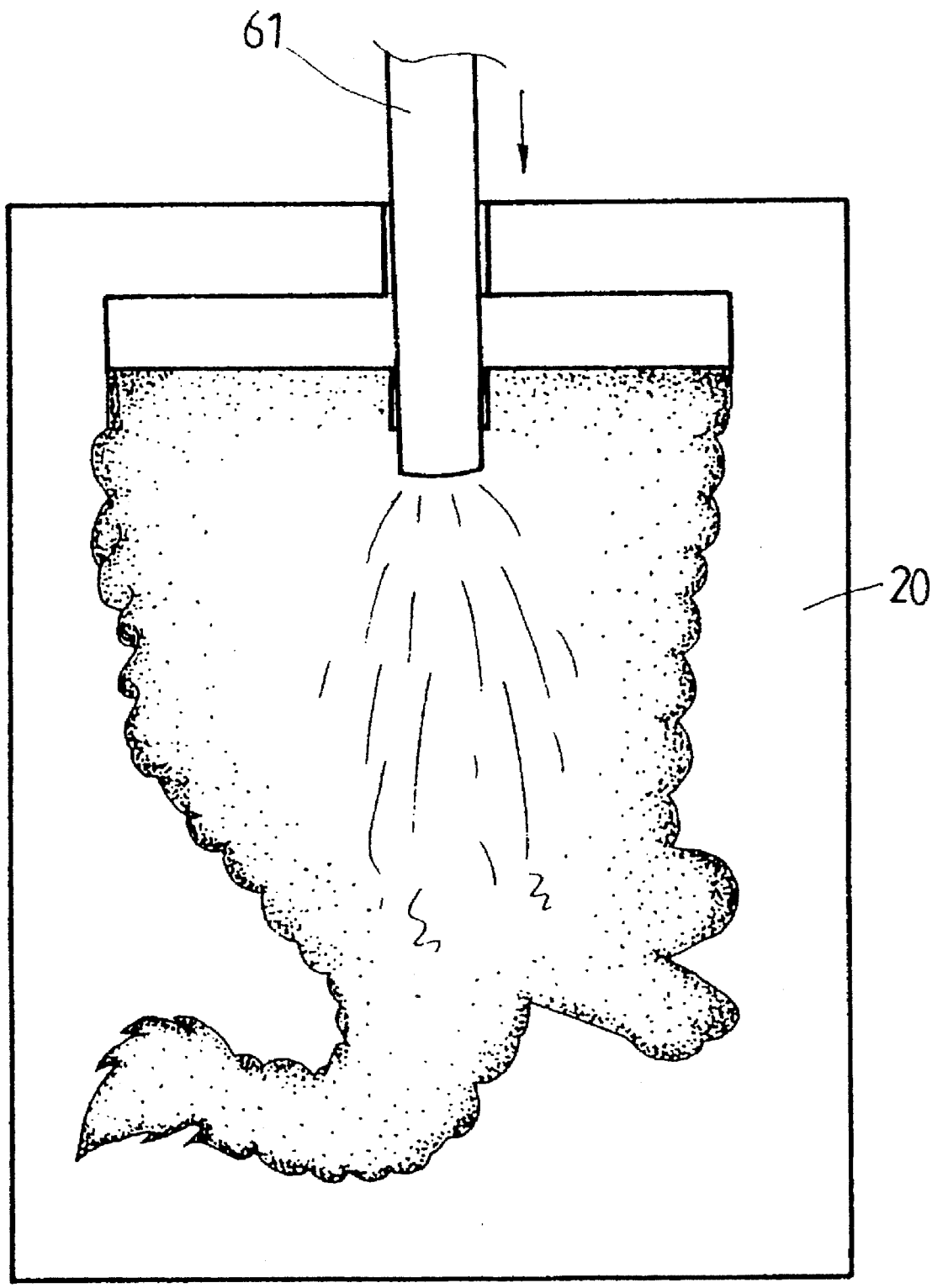
FIG. 4 illustrates an embodiment of the coloring device of the present invention.

3. Through delivery by conveyor belt 10, the dies 20 are delivered to freezing mixture tank 40 for freezing causing water in the dies 20 to freeze from outer to inner part; referring to FIG. 3, boring head 51 of boring device 50 may drill a hole from the outer layer of ice carvings through boring hole 26 of dies 20; referring to FIG. 4, injection tube 61 of injection device 60 is extending into the hole for forcing air out of dies 20 and injecting coloring or decorative objects into the ice carvings; freezing mixture tank 40 will continue to freeze all water in the dies 20.

Figure 5:
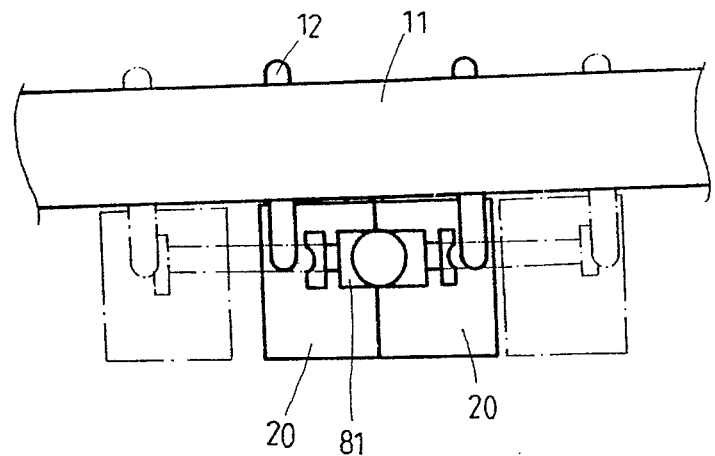
FIGS. 5A and 5B are side and top views illustrating an embodiment of the die of the present invention.
Figure 5:
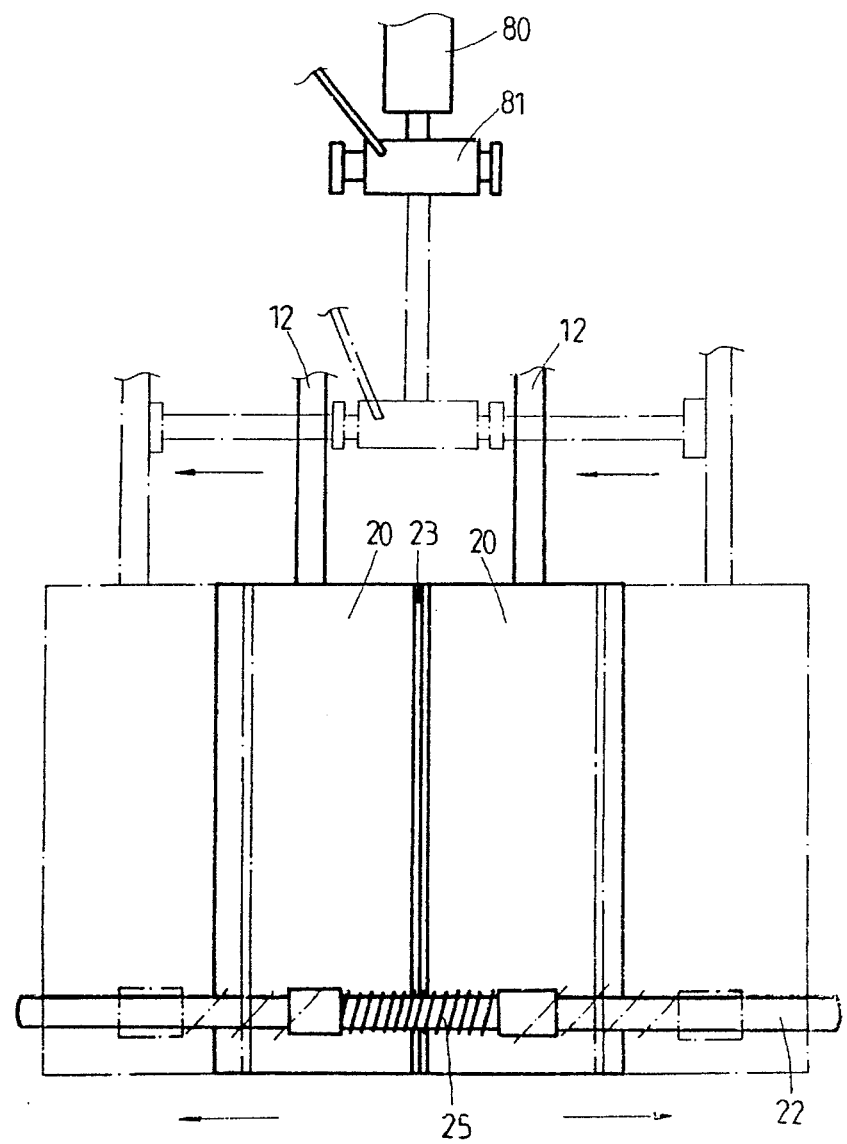

4. When the dies are disengaged from freezing mixture tank 40, they enter temperature rising device 70 to enable the ice carvings in the dies 20 to melt and slightly separate from the dies 20 due to slight temperature rising. Referring to FIG. 5 A and B, when dies 20 have reached the stripping device 80, hydraulic cylinder 81 of stripping device 80 descends down, extensible rods on each side of hydraulic cylinder 81 expand the brackets 12 above two dies 20 to enable dies 20 to be opened immediately and to enable the ice carvings to enter the next conveyor belt. Because there is running rail mounted around the dies 20, when the dies 20 are opened or closed, running rail 22 can be steady and accurate in position.

Through the operation of the aforesaid members, it is available for mass and automatic production of ice carvings at low cost to enable the price of ice carvings to become popular and to enable ice carvings to be filled with colors and decorative objects.

Figure 6:
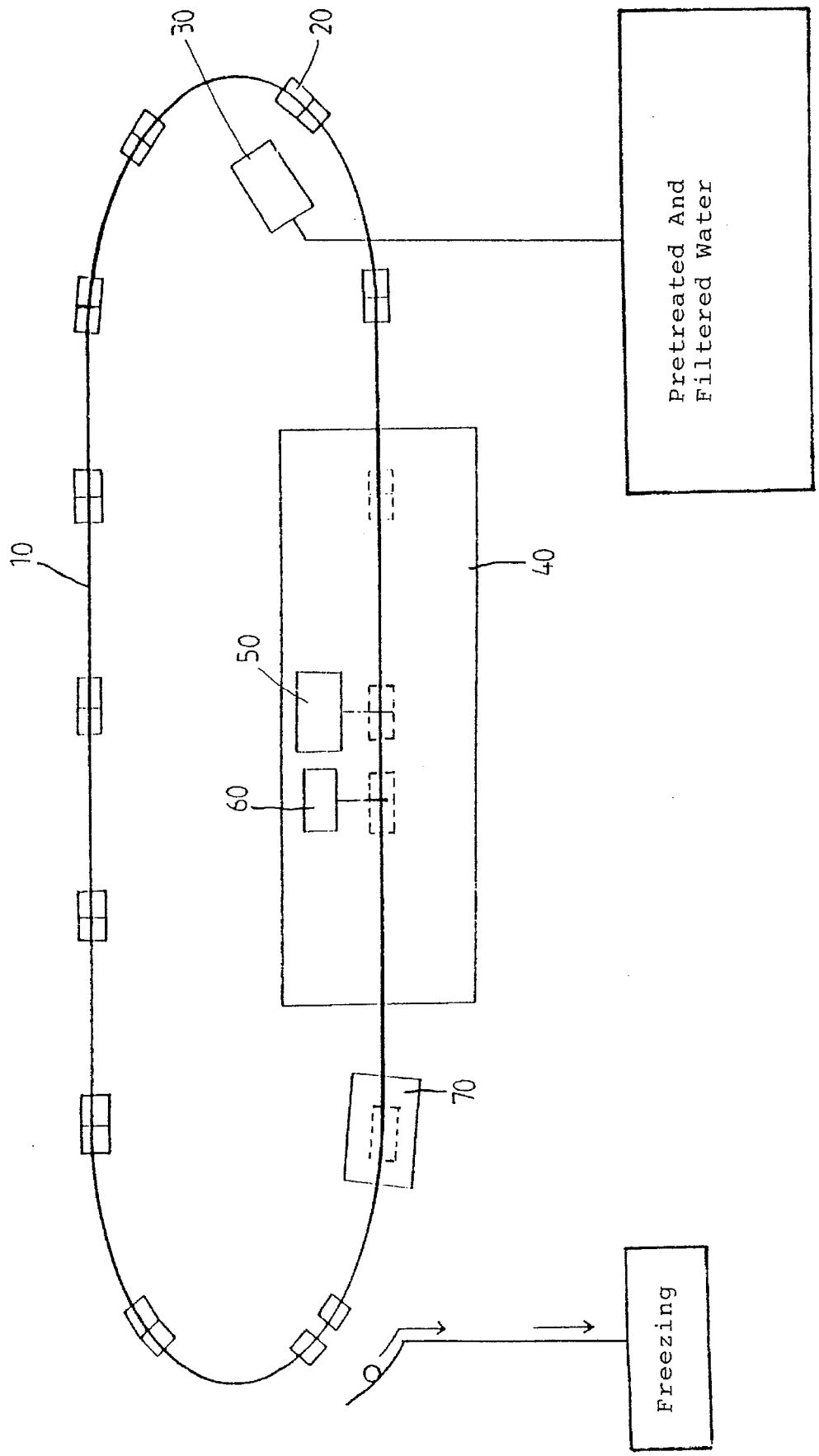
FIG. 6 is a schematic diagram of another embodiment of the conveyor belt of the present invention.

Referring to FIG. 6, the conveyor belt 10 may also be arranged in a circular configuration to enable the process to become continuous.

I claim:

1. A mass production device for ice carvings comprising:

conveyor belt, molding dies, a cool water tank, a freezing mixture tank, a boring device, an injection device, a temperature rising device, and a stripping device;

said molding dies having a die cavity therein and a leak-proof washer around a perimeter thereof and a boring hole on a top thereof;

sidewise brackets extending from the dies and having a pulley thereon;

a first spring mounted between the sidewise brackets;

a running rail extending substantially around the dies;

a second spring connected to the running rail for connection of the two dies;

said cool water tank having a water guide tube to inject cool water into the die cavity;

said freezing mixture tank filled with a freezing chemical via a freezer;

said boring device having a boring head extensible so as to enter the cavity of said die through said boring hole;

said injection device having an injection tube extensible into said die cavity for injection of coloring liquid into said die cavity;

said temperature rising device causing a slight rise of temperature within the die;

said stripping device having a hydraulic lifter with an extensible hydraulic cylinder to open said molding dies;

whereby said brackets extending from said dies aye inserted in a slide rail under the dies to be transported from the injection of cool water from the cool water tank by means of the pullies running in the slide rail, the freezing mixture tank for freezing and, when an outer part is frozen in formation, said dies are delivered to the boring device for boring a hole in the frozen portion in the cavity and injection of coloring liquid from the injection device to make interiors of the ice carvings more colorful when frozen in full, said dies enter the temperature rising device to cause the ice carving to slightly separate from the dies to facilitate die removal.

* * * * *